United States Patent Office 3,509,163
Patented Apr. 28, 1970

3,509,163
2-ALKANOYL OR AROYL-3-AMINOALKOXY INDOLES
Arne Elof Brandstrom, Goteborg, and Stig Ake Ingemar Carlsson, Molnlycke, Sweden, and André Gagneux, Basel, Switzerland, assignors to Geigy Chemical Corporation, Ardsley, N.Y., a corporation of New York
No Drawing. Filed Jan. 22, 1968, Ser. No. 699,289
Claims priority, application Switzerland, Jan. 25, 1967, 1,131/67
Int. Cl. C07d 27/56
U.S. Cl. 260—294.7                  17 Claims

ABSTRACT OF THE DISCLOSURE

The compounds are of the class of indole derivatives, more particularly indole derivatives substituted in 2- and 3-positions and acid addition salts thereof. The compounds are useful as analgesic, anti-inflammatory, anti-tussive, tranquilizing, anti-allergic and anaesthesia-potentiating agents. An illustrative embodiment is 2-benzoyl-3-(2-pyrrolidinoethoxy)indole.

---

The present invention concerns new indole derivatives having valuable pharmacological properties, their pharmaceutically acceptable salts with inorganic and organic acids, and processes for the production of these new indole derivatives.

It has been found that new indole derivatives of the general formula

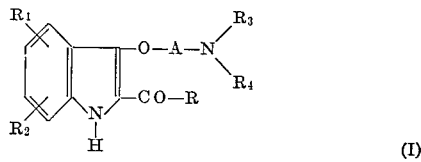

(I)

wherein

R represents lower alkyl or phenyl which can be substituted by lower alkyl, lower alkoxy, or halogen particularly chlorine, bromine, and fluorine;
$R_1$ and $R_2$ independently of each other represent hydrogen, lower alkyl, lower alkoxy or lower alkanoyloxy, phenylalkoxy having at most 9 carbon atoms, fluorine, chlorine, bromine or hydroxy, or $R_1$ and $R_2$ taken together represent methylenedioxy,
A represents alkylene having not more than 4 carbon atoms, and $R_3$ and $R_4$ each represent lower alkyl or, as —$NR_3R_4$ they represent pyrrolidino, piperidino, hexamethyleneimino, morpholino, lower dialkyl morpholino or tetrahydropyridino, and acid addition salts thereof;

have valuable pharmacological properties, in particular analgesic, anti-inflammatory, as well as anti-tussive, tranquilising, anti-allergic, anti-oedematous, adrenolytic and anaesthesia-potentiating activity. At the same time they have relatively slight toxicity and are thus suitable as active substances in pharmaceutical preparations for the relief and removal of painful conditions, for the treatment of inflammation, peripheral disturbances of the circulation, tussive irritation, certain mental disorders which are accessible to treatment with tranquilizers as well as anaesthesia potentiation.

Furthermore the present invention relates to novel methods and compositions containing a compound of the above-mentioned formula for effecting analgesic, anti-inflammatory, anti-tussive, tranquilizing, anti-allergic, anti-oedematous, adrenolylic, and anaesthesia-potentiating activities in warm-blooded animals, especially mammals. More particularly, the method of effecting analgesic, anti-inflammatory, anti-tussive, tranquilizing, anti-allergic, anti-oedematous, adrenolgesic, and anaesthesia-potentiating activities in mammals is concerned with administering a compound as defined in the above formula in therapeutic doses.

According to this invention the scope of the substituents as defined in the above-mentioned formula may be characterized as follows:

The term "lower alkyl" as used herein alone or in "lower alkoxy," "lower alkanoyloxy" and "phenylalkoxy" means straight or branched alkyl chains of the general formula $C_mH_{2m+1}$ wherein $m$ represents an integer of up to 5 carbon atoms. Illustrative of such alkyl groups are methyl, ethyl, propyl, isopropyl, butyl, and the like; illustrative of alkoxy groups are methoxy, ethoxy, propoxy, iso-propoxy, butoxy, iso-butoxy, amyloxy, iso-amyloxy, and the like; illustrative embodiments of alkanoyloxy are acetoxy, propionoxy, butyroxy, and the like; illustrative embodiments of phenylalkoxy are phenylmethoxy, phenylethoxy, phenylpropoxy and the like.

The term "alkylene" stands for straight or branched alkylene chains of up to 4 carbon atoms. Illustrative embodiments of alkylene are methylene, ethylene, propylene (1,3), butylene (1,4), propylene (1,2), 2-methyl propylene (1,3) and the like.

The new compounds of general Formula I and their salts are produced in a surprisingly simple way by reacting an indole derivative of the general Formula II

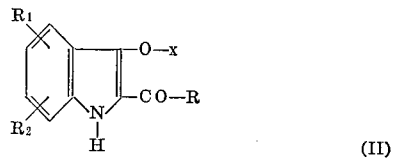

(II)

wherein R has the meaning given above and $R_1$ and $R_2$ have the meanings given above with the exception of hydroxy groups, with a compound of the general Formula III

(III)

wherein A, $R_3$, $R_4$ and —$NR_3R_4$ have the meanings given above and x and y represent atoms or atom groups which can react together with formation of an ether bridge between the pyrrole ring and A, optionally removing the protective groups by hydrolysis or hydrogenolysis and, if desired, converting a compound of the general Formula I having a hydroxy group as $R_1$ and/or $R_2$ into a compound of Formula I by treatment with a corresponding alkylating or alkanoylating agent, in which compound $R_1$ and/or $R_2$ represent(s) lower alkoxy or alkanoyloxy and, if desired, converting the reaction products so obtained into pharmaceutically acceptable salts.

In the general Formula I, for example:

A can represent a radical of the formula —$CH_2$—$CH_2$—, —$CH_2$—$CH_2$—$CH_2$—, —$CH(CH_3)$—$CH_2$— or —$CH(CH_3)$—$CH(CH_3)$—

R can represent the methyl, ethyl, n-propyl, isopropyl, n-butyl, isobutyl, n-amyl, phenyl, o-tolyl, m-tolyl, p-tolyl, 2,4-dimethylphenyl, 2-chloro-4-methylphenyl, o-methoxyphenyl, m-methoxyphenyl, p-methoxyphenyl, o-ethoxyphenyl, m-ethoxyphenyl, p-ethoxyphenyl, 3,4-methylenedioxyphenyl, p - n - propoxyphenyl, p-isopropoxyphenyl, p-n-butoxyphenyl, o-chlorophenyl, m-chlorophenyl, p-chlorophenyl, o-bromophenyl, m-bromophenyl, p-bromophenyl, o-fluorophenyl or p-fluorophenyl group;

$R_1$ and $R_2$ can represent hydrogen, methyl, ethyl, n-propyl, isopropyl, n-butyl, isobutyl, n-amyl, methoxy, ethoxy, n-propoxy, isopropoxy, n-butoxy, acetoxy, propionoxy, butyroxy, isobutyroxy, benzyloxy, phenylethyloxy, phenyl-(n)-propoxy or hydroxy groups, fluorine, chlorine or bromine and, together they can represent the methylenedioxy group;

$R_3$ and $R_4$ independently of each other can represent the methyl, ethyl, n-propyl, isopropyl, n-butyl, isobutyl or n-amyl group and —$NR_3R_4$ can represent the pyrrolidino, piperidino, hexamethyleneimino, morpholino, 2,6-dimethyl-morpholino or a tetrahydropyridino group.

In the general Formulae II and III, for example, $x$ represents hydrogen, sodium, potassium, rubidium or trialkyl ammonium, and $y$ represents halogen such as chlorine or bromine, or an equivalent group functionally such as the benzenesulphonyloxy or toluenesulphonyloxy group.

Protected hydroxy groups $R_1$ and/or $R_2$ in general Formula II are, e.g. lower alkanoyloxy groups which can be split off hydrolytically such as the acetoxy group and the methoxy group, or the benzyloxy group which can be split off hydrogenolytically or hydrolytically. The liberation of hydroxy groups from lower alkanoyloxy groups, methoxy groups or benzyloxy groups is an optional measure depending on the definition of $R_1$ and $R_2$ in Formula I.

Any hydrolytic ether cleavage to convert an alkoxy radical in the substituent $R_1$ and/or $R_2$ into the hydroxy radical is performed by known methods, particularly by treatment with 48% hydrobromic acid. Any conversion of an alkanoyloxy radical in the substituent $R_1$ and/or $R_2$ into the hydroxyl group is performed by hydrolysis, also by known methods.

Diazo alkanes such as diazo methane are used as alkylating agents, i.e., for the conversion of a hydroxy group as $R_1$ and/or $R_2$ into a low alkoxy group.

Chiefly reactive functional derivatives of lower alkane carboxylic acids such as anhydrides and halides are suitable as alkanoylating agents, i.e., for the conversion of the hydroxyl group as $R_1$ and/or $R_2$ into a lower alkanoyloxy group. Acetic acid anhydride, propionic acid anhydride, acetyl chloride, acetyl bromide and propionyl chloride can be mentioned.

The reaction according to the invention is preferably performed in a solvent, e.g. acetone, dioxane, ethyl acetate, dimethyl sulphoxide or dimethyl formamide, or in a mixture of solvents. The use of a basic condensing agent such as potassium carbonate, rubidium carbonate or sodium hydride is optional.

Compounds of general Formula I are produced by a second process by reacting, in the presence of a strong base, an indole derivative of the general Formula IV

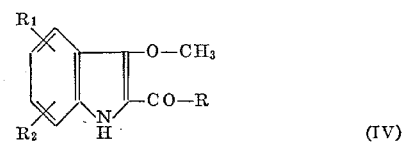
(IV)

wherein $R_1$, $R_2$ and R have the meanings given in Formula I, with a compound of the general Formula V

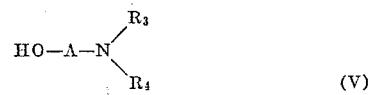
(V)

wherein $R_3$, $R_4$ and A have the meanings given in Formula I, and if desired, converting a compound so obtained of general Formula I into pharmaceutically acceptable salt. The reaction is preferably performed at temperatures at which the methanol liberated, optionally together with a part of the reaction medium, distills off. An excess of compound of the general Formula V, alone or in admixture with an inert organic solvent such as toluene, serves as reaction medium. As strong bases, alkali metals or alkali metal compounds such as sodium or sodium hydride are used, by means of which the equimolar amount of the compound of general Formula V or a fraction thereof is converted into the corresponding alcoholate before the reaction with the indole derivative of general Formula IV. Also, benzyl-trimethyl ammonium hydroxide, for example, can be used as strong base.

If desired, the new indole derivatives of general Formula I are converted into salts with inorganic and organic acids such as hydrochloric acid, hydrobromic acid, sulphuric acid, phosphoric acid, methane sulphonic acid, ethane sulphonic acid, 2-hydroxyethane sulphonic acid, acetic acid, lactic acid, succinic acid, fumaric acid, maleic acid, malic acid, tartaric acid, citric acid, ascorbic acid, benzoic acid, salicylic acid, phenylacetic acid, mandelic acid or embonic acid. These and other salts an be produced in the usual way. For example, the acid desired as salt component or a solution thereof is added to a solution, heated if desired, of an amine of general Formula I in an organic solvent such as diethyl ether, methanol, ethanol, isopropanol, acetone or butanone, or in water and the salt which is precipitated is isolated immediately or after cooling, concentrating or adding another organic liquid, e.g. diethyl ether, to one of the alkanols mentioned.

The starting materials of the general Formula II

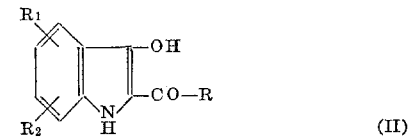
(II)

wherein R, $R_1$ and $R_2$ have the meanings given above, can be produced by the following method:

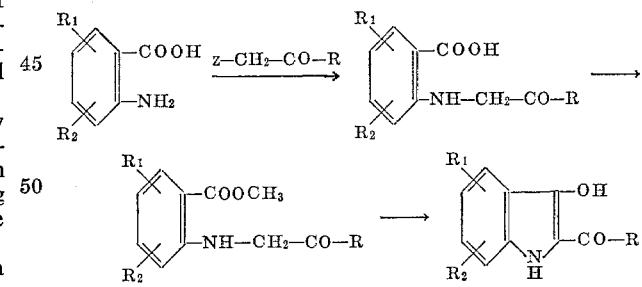

wherein $z$ is a halogen atom when R is an alkyl group, cf. German Patent No. 111,890 of the 29th May, 1900, or it is a hydroxy group when R is a phenyl group or substituted phenyl group. Synthesis of N-phenacyl anthranilic acids.

Most of the compounds of this type can be produced by the following general process:

0.2 mol. of an ω-hydroxy-acetophenone and 0.2 mol of an anthranilic acid are dissolved in 200 ml. of 95% ethanol and the mixture is refluxed overnight. The mixture is then cooled to −10°. The precipitated crystals generally consist of the desired product. If this is the case, they are filtered off. When the crystals consist of one of the starting materials, the reaction mixture is heated to dissolve them and again cooled. In general, the right product is obtained on scraping or seeding.

The reaction product is generally impure and difficult to purify. Luckily, it can be used directly for the following steps. A few examples of reaction products are given in Table 1.

Synthesis of N-phenacyl anthranilic acid methyl esters

These compounds are produced by the following general process:

The crude N-phenacyl anthranilic acid is added to an excess of diazomethane in ether. The mixture is left to stand for some hours at room temperature and then the ether is evaporated off under reduced pressure. The residue is recrystallised from methanol or ethanol.

Some illustrative examples of compounds produced by this method are given in Table 2.

Production of 2-benzoyl-3-hydroxy-indoles

The following general process is used for all compounds of this type:

0.1 mol. of sodium of sodium is dissolved in 250 ml. of 99.5% ethanol. 0.1 mol. of N-phenacyl anthranilic acid methyl ester is added and the mixture is refluxed for 20 minutes. It is then poured onto a mixture of ice and hydrochloric acid. The crystals formed are filtered off and recrystallised, generally from ethanol.

A few illustrative examples of the numerous compounds produced by this method are given in Table 3.

The following method can also be used for the production of 2-benzoyl-3-hydroxy-indoles:

30 mg. (150 mM.) of phenacyl bromide in 50 g. (330 mM.) of anthranilic acid methyl ester are left to stand for 20 hours at 20°. The crystalline mass formed is heated for 2 hours at 90°, allowed to cool and then dissolved in 300 ml. of abs. ethanol. A solution of 6.9 g. (300 mM.) of sodium in 400 ml. of abs. ethanol is then added and the mixture is refluxed for 30 minutes, after which it is evaporated. The residue is dissolved in 500 ml. of water and 150 ml. of methylene chloride and then filtered through Celite and active charcoal. The aqueous phase is isolated, extracted four times with 150 ml. of methylene chloride each time and then acidified to pH 1 with 100 ml. of 2 N hydrochloric acid. The precipitate so obtained is filtered off, washed with 50 ml. of water and recrystallised from ethanol. The yield of 2-benzoyl-3-hydroxyindole is 65%. It melts at 126°.

A few examples of indoxy derivatives produced by this method are given in Table 4.

TABLE 1

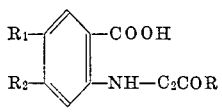

| R | $R_1$ | $R_2$ | Yield, percent | M.P., degrees | Purity |
|---|---|---|---|---|---|
| $C_6H_5$ | H | H | 43 | 205 | |
| $C_6H_5$ | $CH_3O$ | H | 61 | 210 | |
| 4'—$CH_3$—$C_6H_4$ | H | H | 59 | 232 | Impure. |
| 4'—$CH_3O$—$C_6H_4$ | H | H | 62 | 100 | Do. |
| 4'—$CH_3O$—$C_6H_4$ | $CH_3$ | H | 65 | 110 | Do. |
| 4'—$C_2H_5O$—$C_6H_4$ | H | H | 62 | 160-170 | Do. |
| 4'—$C_2H_5O$—$C_6H_4$ | $CH_3$ | H | 34 | 224 | Pure. |
| 4'—$C_2H_5O$—$C_6H_4$ | H | $CH_3$ | 56 | 160 | Impure. |
| 4'—Cl—$C_6H_4$ | $CH_3O$ | H | 20 | 218 | Pure. |

TABLE 2

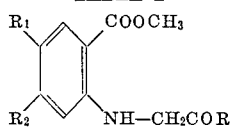

| R | $R_1$ | $R_2$ | Yield, percent | M.P., degrees |
|---|---|---|---|---|
| $C_6H_5$ | H | H | 89 | 78-79 |
| $C_6H_5$ | $CH_3O$ | H | 80 | 105 |
| 4'—$CH_3$—$C_6H_4$ | $CH_3$ | H | 86 | 126 |
| 4'—$CH_3O$—$C_6H_4$ | H | H | 65 | 96-99 |
| 4'—$CH_3O$—$C_6H_4$ | $CH_3$ | H | 70 | 99-103 |
| 4'—$C_2H_5O$—$C_6H_4$ | H | H | 35 | 146 |
| 4'—$C_2H_5O$—$C_6H_4$ | $CH_3$ | H | 59 | 147 |
| 4'—$C_2H_5O$—$C_6H_4$ | H | $CH_3$ | 58 | 141 |

TABLE 3

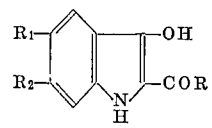

| R | $R_1$ | $R_2$ | Yield, percent | M.P., degrees |
|---|---|---|---|---|
| $C_6H_5$ | H | H | 74 | 126 |
| $C_6H_5$ | $CH_3O$ | H | 68 | 154 |
| 4'—$CH_3C_6H_4$ | $CH_3$ | H | 83 | 188 |
| 4'—$CH_3OC_6H_4$ | H | H | 48 | 157-158 |
| 4'—$CH_3OC_6H_4$ | $CH_3$ | H | 78 | 137 |
| 4'—$C_2H_5OC_6H_4$ | H | H | 73 | 147 |
| 4'—$C_2H_5OC_6H_4$ | $CH_3$ | H | 66 | 187 |
| 4'—$C_2H_5OC_6H_4$ | H | $CH_3$ | 58 | 158 |

TABLE 4

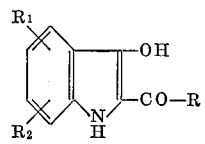

| R | $R_1$ | $R_2$ | M.P., degrees |
|---|---|---|---|
| $C_6H_5$ | H | H | 126 |
| $C_6H_5$ | $CH_3O$— | H | 154 |
| $C_6H_5$ | $C_6H_5$—$CH_2$—O— | H | 135 |
| $C_6H_5$ | $C_6H_5$—$CH_2$—O—O—$CH_2$—O— | H | 215 |
| $C_6H_5$ | —Cl | H | 142 |
| 4'—Cl—$C_6H_4$ | H | H | 168 |
| 4'—$CH_3$—$C_6H_4$ | H | H | 154 |
| $CH_3$ | H | H | 155 |
| $-\overset{CH_3}{\underset{CH_3}{C}}-CH_3$ | H | H | (¹) |

¹ No melting point honey.

Starting materials of the general Formula IV for the second production process are obtained analogously to the first production process for end products of the general Formula I by reacting a starting material of the general Formula II with a methyl halide or dimethyl sulphate or diazomethane instead of with a compound of the general Formula III.

As pointed out above, the compounds of the present invention, i.e. compounds of the above-described general Formula I and their physiologically tolerable acid addition salts possess valuable pharmacological and therapeutic properties and may be used in the form of pharmaceutical compositions, especially as analgesic, anti-inflammatory, anti-tussive, tranquilizing, anti-allergic, anti-oedematous, adrenolytic, and anaesthesia-potentiating agents in warm-blooded animals, particularly mammals.

The toxicity of the compounds of the instant invention is low: for instance, the $LD_{50}$ of 2-benzoyl-3-(2-pyrrolidinoethoxy)indole hydrochloride administered orally to rats is higher than 120 mg./kg. and higher than 15 mg./kg. on intravenous administration to mice.

The anti-inflammatory activity of the compounds of the above-mentioned general formula is illustratively demonstrated by the following test:

Into each member of a group of 20 rats weighting between 120 and 160 g. are injected intraperitoneally different doses of 2-benzoyl-3-(2-pyrrolidinoethoxy)indole hydrochloride. Five minutes later 0.1 ml. of a 0.05% aqueous solution of serotonin-kreatininsulfate is injected into one hind paw of each of the test animals. The animals are sacrificed two hours after serotonin administration and the extent of the swelling is determined by measuring the weight differences of the paws treated with serotonin solution and the untreated paws.

A control group of 20 rats having not obtained the test compound but having been treated with serotonin like the test rats is also sacrificed after two hours and the extent of swelling determined. The change of the average weight difference of the hind paws of the first group versus the average weight difference of the hind paws of the control group is expressed in percent over control. The results are given in the following table.

| | Number of rats treated | Dosages, mg./kg. | Reduction of swelling in percent |
|---|---|---|---|
| Control | 20 | 0 | |
| 2-benzoyl-3-(2-pyrrolidino-ethoxy)-indole hydrochloride | 20 | 2 | >−30 |
| | 20 | 5 | >−60 |
| | 20 | 10 | >−70 |
| | 20 | 25 | >−90 |

The analgesic activity of 2-benzoyl-3-(2-pyrrolidinoethooxy)-5,6-methylenedioxy indole hydrochloride was determined on white mice according to the method of A. Gross described in Arch. exp. Path. and Pharmacologie 229, 400 (1956); also described by F. E. D'Amour and D. L. Smith in J. Pharmacol. Exptl. Therap. 72, 74 (1944) and by W. B. Bass and N. J. Vander-Brook in J. Am. Pharm. Assoc. (Sci. Ed.) 41, 509 (1952), with the apparatus according to Friebel and Reichle. According to this method, it was shown that dosages of 25 to 100 mg./kg. p.o. have a significant analgesic activity.

In another test for analgesic activity, i.e. a test wherein a suspension of phenylquinone is injected to mice to cause pain, 39 mg./kg. of 2-benzoyl-3-(2-pyrrolidinoethoxy)-5,6-methylenedioxy indole hydrochloride was an effective dosage to show analgetic activity on oral administration to mice.

The anti-tussive activity of 2-benzoyl-3-(2-pyrrolidinoethoxy) indole hydrochloride was determined according to the method described by R. Domenjoz in Archive für experimentelle Pathologie und Pharmakologie 215, 19–24 (1952). The test was carried out by narcotizing healthy cats of normal weight with a suitable narcotic. Doses of 40–60 mg./kg. of Numal "Roche" were applied interperitoneally to obtain a relatively superficial narcosis. A definite anti-tussive effective was determined at a dose of 1.0 mg./kg. on intravenous administration to the anaesthetized cats.

The anaesthesia-potentiating activity was determined as follows:

The compounds to be tested are administered to male and female mice weighing between 17 g. and 25 g. thirty minutes prior to the administration of the anaesthesia-potentiating 2-benzoyl - 3-(2-pyrrolidinoethoxy) indole hydrochloride and 2-benzoyl - 3-(2-pyrrolidinoethoxy)-5,6-methylenedioxy indole hydrochloride. The extent to which anaesthesia induced by a standard amount, i.e. a 0.4% solution of Estil (2-methoxy-4-allyl-phenoxy acetic acid N,N-diethyl amide) in 30% propyleneglycol, is prolonged by a known dose of the test compound. The standard amount of anaesthetic is 40 mg./kg. i.p. Anaesthetized mice remain in side position, the criterion for anaesthesia, for a certain amount of time which is recorded for each animal. The control animals received the standard amount of anaesthetic only; the test animals received the test compounds in aqueous solution by subcutaneous injection. The change in the duration of the anaesthetic effect is calculated in percent of the effect observed with the control group; the results are given in the following table.

| | Dosages, mg./kg. | Diffirence, percent | Number of mice tested |
|---|---|---|---|
| 2-benzoyl-3-(2-pyrrolidino-thoxy)-indole hydrochloride | 5 | >+60 | 10 |
| | 20 | >+450 | 10 |
| 2-benzoyl-3-(2-pyrrolidino-ethoxy)-5,6-methylenedioxy- | 0.5 | >+40 | 20 |
| | 2 | >+100 | 20 |
| | 5 | >+150 | 20 |
| | 5 | >+500 | 20 |

2-benzoyl - 3-(2-pyrrolidino ethoxy)indole hydrochloride was also tested for its tranquilizing activity in aggressive male mice weighing between 34 and 50 g. Male mice, after having been isolated in individual cages for 3 weeks are brought together pairwise for 1 minute per experiment choosing only mice that attack each other within 25 seconds. The dosage is determined in which 50% of the mice do not show aggression, called D.e.50. The D.e.50 for the above-mentioned compound is 3 mg./kg. s.c.

The compounds of the present invention may be used in warm-blooded animals, particularly mammals, as medicaments in the form of pharmaceutical compositions containing the compounds in admixture or conjunction with a pharmaceutical organic or inorganic, solid or liquid carrier for oral, rectal, or parenteral administration.

The total daily doses for animals vary from about 5 mg./kg. to about 50 mg./kg., preferably about 10 mg./kg. to 25 mg./kg. Daily dosages for patients can vary from about 1 mg./kg. to about 5 mg./kg. preferably from about 2 mg./kg. to about 3 mg./kg. The preferred route of administration is the oral route. Suitable compositions include, without limitation, tablets, capsules, powder solutions, suspensions, sustained release formulations and the like.

The following examples further illustrate the present invention. All temperatures are in degrees centigrade.

EXAMPLE 1

A mixture of 10 g. of 2-benzoyl-3-hydroxy-indole, 100 ml. of acetone, 17.3 g. of potassium carbonate and 6.6 g. of 2-dimethylamino-ethyl chloride-hydrochloride is refluxed for 24 hours. The mixture is filtered and acetone and volatile impurities are removed by distillation under reduced pressure on a water bath. The residue is dissolved in ether and the hydrochloride is dissolved by the addition of a solution of hydrochloric acid in ether. The product is filtered off and recrystallised from ethanol. 4.4 g. of 2-benzoyl-3-(2-dimethylamino-ethoxy)-indole are obtained in this way in the form of the hydrochloride, M.P. 220°.

EXAMPLE 2

A mixture of 5.2 g. of 2-(p-ethoxybenzoyl)-3-hydroxy-5-methyl-indole, 60 ml. of acetone, 7.3 g. of potassium carbonate and 3.0 g. of 2-pyrrolidino-ethyl chloride-hydrochloride is refluxed for 24 hours. The product is isolated as described in Example 1. After recrystallisation from isopropanol, 4.2 g. of 2-(p-ethoxybenzoyl)-3-(2-pyrrolidinoethoxy)-5-methyl-indole hydrochloride are obtained, M.P. 207°.

EXAMPLE 3

A mixture of 10 g. of 2-(p-methylbenzoyl)-3-hydroxy-5-methyl-indole, 100 ml. of dioxane, 15.7 g. of potassium carbonate and 7.1 g. of 2-pyrrolidino-ethyl chloride-hydrochloride is refluxed for 24 hours. The product is isolated as described in Example 1. After recrystallisation from ethanol, 8.4 g. of 2-(p-methylbenzoyl)-3-(2-pyrrolidino-ethoxy)-5-methyl-indole hydrochloride are obtained, M.P. 230°.

EXAMPLE 4

8.4 g. of p-toluene sulphonyl chloride, 200 ml. of acetone and 5.1 g. of 2-pyrrolidino-ethanol are placed in a 500 ml. flask fitted with a stirrer and reflux condenser. The mixture is refluxed for 10 minutes and then cooled. 11.8 g. of 2-(p-ethoxybenzoyl)-3-hydroxy-5-methyl-indole and 16.6 g. of potassium carbonate are then added and the mixture is refluxed overnight. After cooling, the mixture is filtered and the acetone is evaporated off. The residue is extracted with boiling ether, the ether is evaporated and the residue is dissolved in 200 ml. of acetone. This solution is acidified with a solution of hydrochloric acid in acetone and filtered hot. It is then concentrated to a small volume. After allowing to cool, 2-(p-ethoxybenzoyl)-3-(2-pyrrolidino-ethoxy) - 5 - methyl-indole hydrochloride is obtained, M.P. 207°.

EXAMPLE 5

A mixture of 8.5 g. of 2-(p-ethoxybenzoyl)-3-hydroxy-5-methyl-indole, 200 ml. of acetone and 10.8 g. of 2-pyrrolidino-ethyl chloride is refluxed overnight. 10 g. of potassium carbonate are then added and the mixture is stirred under reflux for a few minutes. The product is then isolated in the same way as described in Example 2. The product so obtained requires repeated recrystallisation from isopropanol until its melting point is 207°.

EXAMPLE 6

A mixture of 11.2 g. of 2-benzoyl-3-hydroxy-indole, 120 ml. of triethylamine and 7.5 g. of 2-dimethylamino-ethyl chloride-hydrochloride is refluxed overnight. 20 g. of potassium carbonate are then added. The mixture is filtered and the residue is treated as described in Example 1. The product so obtained requires repeated recrystallisation from ethanol until its melting point is 220°.

EXAMPLE 7

1.0 g. of 50% sodium hydride are dissolved in 150 ml. of dimethylsulphoxide. 11.8 g. of 2-(p-ethoxybenzoyl)-3-hydroxy-indole and 6.7 g. of 2-pyrrolidinoethyl chloride are then added. The mixture is stirred for 3 hours on a water bath, allowed to cool and filtered. The solvent is distilled off under reduced pressure and the residue is dissolved in ether. The hydrochloride is precipitated by the addition of a solution of hydrochloric acid in ether and the product is recrystallised from ethanol. 5 g. of 2-(p-ethoxybenzoyl)-3-(2-pyrrolidino - ethoxy) - indole hydrochloride are obtained, M.P. 166°.

EXAMPLE 8

In Example 2, potassium carbonate is replaced by an equivalent amount of rubidium carbonate. 4.3 g. of 2-(p-ethoxybenzoyl)-3-(2-pyrrolidino - ethoxy) - 5 - methyl-indole hydrochloride are obtained in this way. M.P. 207°.

EXAMPLE 9

A mixture of 11.2 g. of 2-benzoyl-3-hydroxy-indole, 120 ml. of acetone, 19.5 g. of potassium carbonate and 11.5 g. of 2-diethylamino-ethyl bromide is refluxed overnight. The product, 2-benzoyl-3-(2-diethylamino-ethoxy)-indole hydrochloride, is isolated as described in Example 1. Yield: 8.6 g., M.P. 162°.

EXAMPLE 10

If, in Example 2, acetone is replaced by the same volume of dimethyl formamide, 4.0 g. of 2-(p-ethoxybenzoyl)-3-(2-pyrrolidino - ethoxy) - 5 - methyl-indole hydrochloride are obtained, M.P. 207°.

Compounds can also be produced by the method of Example 1 wherein $R_1$ is hydrogen and $R_5$ represents 5-methyl, 6-ethyl, 7-methyl, 5-fluoro, 5-chloro, 5-methoxy and 5-benzyloxy (for hydrogenolysis) to a 5-hydroxy group as well as compounds in which $R_1$ represents 5-methyl and $R_2$ represents 6-methyl or $R_1$ represents 6-methyl and $R_2$ represents 7-methyl, by using correspondingly substituted 2-benzoyl-3-hydroxy-indoles.

Compounds can also be produced by the same method in which $NR_3R_4$ stands for the pyrrolidino, piperidino, hexamethyleneimino, morpholino, 2,6-dimethyl-morpholino and a tetrahydropyridino group, by using the corresponding aminoethyl chloride-hydrochlorides.

Compounds can be also produced by the method of Example 2 wherein R is methyl, tert. butyl, m-methylphenyl, o-methoxyphenyl, p-methylphenyl, p-chlorophenyl and p-bromophenyl, by correspondingly varying the acyl group in the 2-acyl-3-hydroxy-indole.

A series of illustrative examples of compounds produced together with correspondingly yields is summarised in Table 5.

TABLE 5

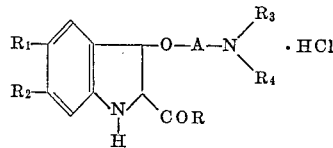

| R | $R_1$ | $R_2$ | A | $N\begin{matrix}R_3\\R_4\end{matrix}$ | Yield, percent | M.P., degrees |
|---|---|---|---|---|---|---|
| $C_6H_5$ | H | H | $CH_2CH_2$ | $N(CH_3)_2$ | 27 | 220 |
| $C_6H_5$ | H | H | $CH_2CH_2$ | $N(C_2H_5)_2$ | 37 | 162 |
| $C_6H_5$ | H | H | $CH_2CH_2CH_2$ | $N(C_2H_5)_2$ | 61 | 160 |
| $C_6H_5$ | H | H | $CH_2CH_2$ | $NC_4H_8$ | 55 | 216 |
| $C_6H_5$ | H | H | $CH_2CH_2$ | $NC_5H_{10}$ | 74 | 226 |
| $C_6H_5$ | H | H | $CH_2CH_2$ | $NC_4H_8O$ | 67 | 230 |
| $C_6H_5$ | $CH_3O$ | H | $CH_2CH_2$ | $NC_4H_8$ | 40 | 244 |
| $4'-CH_3C_6H_4$ | $CH_3$ | H | $CH_2CH_2$ | $NC_4H_8$ | 51 | 230 |
| $4'-CH_3OC_6H_4$ | H | H | $CH_2CH_2$ | $NC_4H_8$ | 62 | 236–238 |
| $4'-CH_3OC_6H_4$ | $CH_3$ | H | $CH_2CH_2$ | $NC_4H_8$ | 45 | 250 |
| $4'-C_2H_5OC_6H_4$ | H | H | $CH_2CH_2$ | $NC_4H_8$ | 57 | 166 |
| $4'-C_2H_5OC_6H_4$ | $CH_3$ | H | $CH_2CH_2$ | $NC_4H_8$ | 56 | 207 |
| $4'-C_2H_5OC_6H_4$ | H | $CH_3$ | $CH_2CH_2$ | $NC_4H_8$ | 33 | 211–221 |
| $C_6H_5$ | $CH_3$ | $CH_3$ | $CH_2CH_2$ | $NC_4H_8O$ | ---------- | 214 |
| $C_6H_5$ | $CH_3$ | $CH_3$ | $CH_2CH_2$ | $NC_5H_8$ | ---------- | 200 |

$NC_4H_8$ = pyrrolidino.
$NC_4H_8O$ = morpholino.
$NC_5H_{10}$ = piperidino.
$NC_5H_8$ = 1,2,3,6-tetrahydropyridino.

EXAMPLE 11

250 mg. of 2-benzoyl-3-methoxyindole are added to a solution of 50 mg. of sodium in 2.0 ml. of 2-pyrrolidino ethanol. The reaction vessel is fitted with a distillation tube and the solution is heated for 24 hours at 120°. The solution becomes dark and a distillate is obtained. The solution is allowed to cool, treated with water and extracted with ether. The ether extract is washed with water and then extracted with dilute hydrochloric acid. The acid extracts are made weakly alkaline and extracted with ether. The extract is washed with water, dried over sodium sulphate and concentrated. The residue is taken up in acetone and a solution of hydrogen chloride in ether is added. The crystalline hydrochloride is obtained by scraping, M.P. 20°–211°. After recrystallisation with the addition of a slight amount of animal charcoal, 2-benzoyl-3-[2-(1-pyrrolidinyl)-ethoxy]-indole hydrochloride is obtained, M.P. 215–217°.

EXAMPLE 12

230 mg. of 2-benzoyl-3-methoxy-indole are added to a solution of 30 mg. of sodium hydride in 2.0 ml. of dimethylamino-ethanol and, after the addition of 5 ml. of toluene, the mixture is heated in a distillation apparatus fitted with a Vigreux column for 24 hours at a temperature of 60–70° in the head of the column. The solution becomes dark coloured and a distillate is obtained. The product is worked up and isolated as described in Example 11. Recrystallised from acetone, 2-benzoyl-3-(2-dimethylaminoethoxy)-indole hydrochloride is obtained in the form of yellowish crystals which melt at 215–217°.

EXAMPLE 13

4.74 g. (20 mM.) of 2-benxoyl-3-hydroxy-indole, 3.17 g. (22 mM.) of 2-dimethylaminoethyl chloride hydrochloride and 6.07 g. (44 mM.) of finely pulverised potash are refluxed for 15 hours in 100 ml. of ethyl acetate and 1 ml. of water.

The reaction mixture is cooled to 15°, 100 ml. of water are added and the organic phase is separated and washed twice with 25 ml. of 1 N sodium hydroxide solution. It is then extracted twice with 100 ml. of 0.5 N hydrochloric acid and the combined extracts are washed with 50 ml. of ether. The base is precipitated by the addition of 2 N ice cold sodium hydroxide solution and isolated by extracting three times with 50 ml. of methylene chloride. The organic phase is dried over potash, concentrated and hydrochloric acid in isopropanol is added to the residue whereupon a 95% yield of 2-benzoyl-3-[2-dimethyl-amino-ethoxy]-indole hydrochloride, M.P. 216°, is obtained.

The compounds given in Table 6 can be produced analogously.

TABLE 6

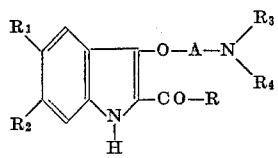

in the form of their hydrochlorides

| R | $R_1$ | $R_2$ | A | $-N\genfrac{}{}{0pt}{}{R_3}{R_4}$ | Yield, percent | M.P., degrees |
|---|---|---|---|---|---|---|
| $C_6H_5$ | Cl | H | $CH_2CH_2$ | $-NC_4H_4$ | 60 | 229 |
| $4'-Cl-C_6H_4$ | H | H | $CH_2CH_2$ | $-NC_5H_{10}$ | 75 | 1 247 |
| $C_6H_5$ | $-O-CH_2-O-$ | | $CH_2CH_2$ | $-NC_4H_8$ | 50 | 1 240 |
| $C_6H_5$ | $CH_3O$ | H | $CH_2CH_2$ | $-NC_4H_8$ | 60 | 244 |
| $C_6H_5$ | $C_6H_5CH_3O$ | H | $CH_2CH_2$ | $-NC_4H_8$ | 65 | 190 |
| $4'-CH_2-C_6H_4$ | H | H | $CH_2CH_2$ | $-NC_4H_8$ | 90 | 242 |
| $CH_3$ | H | H | $CH_2CH_2$ | $-NC_4H_8$ | 90 | 1 275 |
| $4'-Cl-C_6H_4$ | H | H | $CH_2CH_2$ | $-NC_4H_8$ | 60 | 240 |
| $C_6H_5$ | $CH_3O$ | H | $CH_2CH_2$ | $-NC_5H_{10}$ | 85 | 1 222 |
| $-C(CH_3)_3$ | H | H | $CH_2CH_2$ | $-NC_4H_8$ | 40 | 198 |
| $C_6H_5$ | H | H | $CH_2CH_2$ | $-N\genfrac{}{}{0pt}{}{CH_3}{CH_3}$ | 95 | 220 |
| $C_6H_5$ | H | H | $CH_2CH_2$ | $-NC_3H_{10}$ | 87 | 226 |
| $C_6H_5$ | H | H | $CH_2CH_2$ | $-NC_4H_8$ | 85 | 216 |
| $C_6H_5$ | $CH_3$ | $CH_3$ | $CH_2CH_2$ | $-NC_5H_8$ | | 200 |
| $C_6H_5$ | $CH_3$ | $CH_3$ | $CH_2CH_2$ | $-NC_4H_8$ | | (²) |
| $C_6H_5$ | H | $OCH_3$ | $CH_2CH_2$ | $-NC_4H_8$ | | (²) |
| $C_6H_5$ | $CH_3$ | $CH_3$ | $CH_2CH_2$ | $-NC_4H_8O$ | | 214 |

¹ Decomposition.
² Impure.

EXAMPLE 14

10.0 g. (21 mM.) of 2-benzoyl-3-[2-(1-pyrrolidinyl)-ethoxy]-5-benzyloxyindole hydrochloride in 400 ml. of abs. ethanol are hydrogenated under normal pressure using 1 g. of 10% palladium on charcoal as a catalyst. 110% of the calculated amount of hydrogen is taken up quickly.

The catalyst is filtered off, the filtrate is concentrated and the residue is recrystallised from methanol. The yield of 2-benzoyl-3-[2-(1-pyrrolidinyl)-ethoxy] - 5 - hydroxyindole hydrochloride in 40%. It melts at 255° with decomposition.

EXAMPLE 15

10.5 g. (22 mM.) of 2-benzoyl-3-[2-(1-pyrrolidinyl)-ethoxy]-5-benzyloxy-indole hydrochloride are suspended in 50 ml. of glacial acetic acid. On adding 21 ml. (187 mM.) of 40% hydrobromic acid, a clear solution is obtained. After 20 hours at 20°, 500 ml. of ether are added to the reaction mixture, the upper phase is decanted and the residue is dissolved in 300 ml. of warm methanol. The methanolic solution is poured into 1 litre of 0.3 N sodium bicarbonate solution while stirring whereupon a pale yellow precipitate separates out immediately. This is filtered off, washed with water and a slight amount of cold methanol, dissolved in 250 ml. of hot methanol anl finally 3 ml. of concentrated hydrochloric acid are added. After cooling to 0°, the precipitate is filtered off and washed with isopropanol and ether. The yield of 2-benzoyl-3-[2-(1 - pyrrolidinyl)-ethoxy]-5-hydroxy-indole hydrochloride is 78%. It melts at 255° with decomposition.

EXAMPLE 16

200 mg. (0.5 mM.) of 2-benzoyl-3-[2-(1-pyrrolidinyl)-ethoxy]-5-methoxy-indole hydrochloride are left to stand for 48 hours at 20° in 3 ml. of 48% hydrobromic acid. After working up as described in Example 15, 35% of 2-benzoyl-3-[2 - (1 - pyrrolidinyl)ethoxy]-5-hydroxy-indole hydrochloride, M.P. 255°, is obtained.

EXAMPLE 17

386 mg. (1 mM.) of 2-benzoyl-3-[2-(1-pyrrolidinyl)-ethoxy]-5-hydroxy-indole hydrochloride are suspended in 5 ml. of pyridine and 204 mg. (2 mM.) of acetic acid anhydride in 2 ml. of pyridine are added. After 20 hours at 20°, the reaction mixture is poured into 50 ml. of ice water, 5 ml. of 1 N sodium hydroxide solution and 50 ml. of ethyl acetate are added. The organic phase is seperated, washed three times with 50 ml. of water, dried over potash and concentrated. The residue is dissolved in isopropanol, hydrochloric acid in isopropanol is added, the mixture is cooled and the precipitate is filtered off. The yield of 2-benzoyl-3-[2-(1-pyrrolidinyl)-ethozy] - 5 - acetoxyindole hydrochloride, M.P. 208°, is 60%.

EXAMPLE 18

350 mg. (1 mM.) of 2-benzoyl-3-[2-(1-pyrrolidinyl)-ethoxy]-5-hydroxy-indole are dissolved in 50 ml. of hot ethylene glycol dimethyl ether. After cooling, ethereal diazomethane solution is added, and the mixture is left to stand for 2 hours at 20° and then concentrated. The residue is taken up in 20 ml. of isopropanol, 2 ml. of hydrochloric acid in isopropanol are added, the precipitate is filtered off and the residue is washed with cold isopropanol and ether. The yield of 2-benzoyl-3-[2-(1-pyrrolidinyl)-ethoxy] - 5 - methoxy-indole hydrochloride, M.P. 244°, is 80%.

EXAMPLE 19

430 mg. of 2 - benzoyl-3-[2-(1-pyrolidinyl)-ethoxy]-5-acetoxy-indole hydrochloride are refluxed for 2 hours in 100 ml. of 1 N hydrochloric acid. The reaction mixture is concentrated and the residue is recrystallised twice from methanol. The yield of 2-benzoyl-3-[2-(1-pyrolidinyl)-ethoxy]-5-hydroxy-indole hydrochloride is 80%. It melts at 255° with decomposition.

To produce dosage units for oral administration which contain a compound of general Formula I or a pharmaceutically usable salt thereof as active substance, the active substance is mixed with, e.g. solid, pulverulent carrier substances such as lactose, saccharose, sorbitol and mannitol or starches such as potato starch, maize starch and amylopectin. Laminaria powder or citrus plup powder can also be added. Cellulose derivatives or gelatine and also lubricants such as magnesium or calcium stearate or polyethylene glycols of wxy consistency (Carbowax) can be added for the production of tablets or capsule cores. The later can be coated, e.g. with concentrated sugar solutions which can contain gum arabic, talcum and/or titanium dioxide or, however, they can be coated with a lacquer dissolved in easily volatile organic solvents or mixtures of solvents. Dyestuffs can be added to these coatings, e.g. to differentiate between varying contents of active substance. Soft gelatine capsules (closed, pearl shaped capsules) and other closed capsules consists of, e.g. a mixture of gelatine and glycerin and contain for example mixtures of the active substance with Carbowax, and hard gelatine capsules contain, e.g. granulates of the active substance with solid pulverulent carrier substances such as lactose, saccharose, sorbitol or mannitol; starch such as potato starch, maize starch or amylopectin; cellulose derivatives or gelatine as well as magnesium stearate or stearic acid.

Suppositories are used as dosage units for rectal administration. These consist of a mixture of the active substance with a neutral fatty foundation. Also gelatine capsules consisting of a mixture of the active substance with polyethylene glycols of waxy consistency (Carbowax) are suitable for rectal administration.

Syrups and suspensions for oral administration consist, e.g. of a solution which contains at least 2, at most, however, 20% by weight of active substance in addition to sugar and a mixture of ethanol, water, glycerin and also propylene glycol and, e.g. flavourings, saccharine and/or carboxymethyl cellulose (for suspensions).

Ampoules for parenteral administration by injection preferably contain a water soluble, pharmaceutically usable salt of an active substance according to the invention in a concentration of, preferably, 0.5–10%, if desired with suitable stabilising agents and/or buffer substances, in aqueous solution.

The following examples illustrate the production of typical forms for administration of the compounds according to the invention but they are by no means the only forms for administration.

EXAMPLE 20

Prescription for the production of a syrup containing 0.5% (weight per volume) of a compound of general Formula I

|  | Grams |
|---|---|
| Indole derivative of Formula I | 0.5 |
| Saccharine | 0.6 |
| Sugar | 3.0 |
| Glycerin | 5.0 |
| Distilled water | 10.0 |
| Flavouring | 0.1 |
| Ethanol 96% (ad. 10.0 ml.) | |

Sugar and saccharine are dissolved in hot distilled water. While it is cooling, water is added to the solution until it has the required weight and glycerin is added. The aqueous solution is then added to a solution of the active substance and flavouring in about 65 ml. of ethanol and then it is made up to 100 ml. of ethanol.

EXAMPLE 21

250 g. of an indole derivative of Formula I and 175.8 g. of lactose and 169.7 g. of potato starch are mixed, the mixture is moistened with an alcoholic solution of 10 g. of stearic acid and granulated through a sieve. After drying, 160 g. of potato starch, 200 g. of talcum, 2.5 g. of magnesium stearate and 32 g. of colloidal silicon dioxide are mixed in and the mixture is pressed into 10,000 tablets each weighing 100 mg. and containing 25 mg. of active substance. If desired, the tablets can be grooved to enable better adaptation of the dosage instructions.

EXAMPLE 22

A granulate is produced from 250 g. of an indole derivative of Formula I 175.9 g. of lactose and the alcoholic solution of 10 g. of stearic acid. After drying, the granulate is mixed with 56.6 g. of colloidal silicon dioxide, 165 g. of talcum, 20 g. of potato starch and 2.5 g. of magnesium stearate and 10,000 dragee (sugar-coated tablets) cores are pressed from the mixture. These are first coated with an alcoholic solution of 6 g. of shellac, then with a concentrated syrup made from 502.28 g. of crystallised saccharose, 10 g. of gum arabic, 0.22 g. of dyestuff and 1.50 g. of titanium dioxide, and then dried. The dragees obtained each weigh 120 mg. and contain 25 mg. of active substance, e.g. 2-(p-ethoxybenzoyl)-3-(2-morpholino-ethoxy)-5-methyl-indole.

EXAMPLE 23

1.0 g. of 2-(benzoyl)-3-(2-pyrrolidino-ethoxy)-indole and 0.10 g. of ascorbic acid are dissolved in distilled water and the solution is diluted up to 100 ml. The solution obtained is used to fill ampoules each containing, e.g., 1 ml. which corresponds to a content of 10 mg. of active substance. The filled ampoules are then sterilised by heating in the usual way.

EXAMPLE 24

250 g. of 2-benzoyl-3-(2-pyrrolidinoethoxy)-5,6-methylenedioxy indole hydrochloride, 175.8 g. of lactose and 169.7 g. of potato starch are mixed; the mixture is moistened with an alcoholic solution of 10 g. of stearic acid and granulated through a sieve. After drying, 160 g. of potato starch, 200 g. of talcum, 2.5 g. of magnesium stearate and 32 g. of colloidal silicon dioxide are mixed in and the mixture is pressed into 10,000 tablets each weighing 100 mg. and containing 25 mg. of 2-benzoyl-3-(2-pyrrolidinoethoxy)-5,6-methylenedioxy indole hydrochloride. If desired, the tablets can be grooved to enable better adaptation of the dosage instructions.

What is claimed is:
1. A compound of the formula

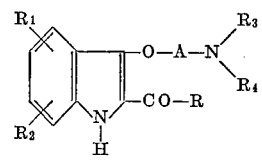

wherein
R represents lower alkyl, phenyl, or phenyl substituted by lower alkyl, lower alkoxy, or fluorine, chlorine, bromine;
$R_1$ and $R_2$ independently of each other represent hydrogen, lower alkyl, lower alkoxy, lower alkanoyloxy, phenylalkoxy with up to 9 carbon atoms, fluorine, chlorine, bromine, hydroxy or $R_1$ and $R_2$ taken together represent methylenedioxy; A represents alkylene with up to 4 carbon atoms; and $R_3$ and $R_4$ each represent lower alkyl, or as —$NR_3R_4$ they represent pyrrolidino, piperidino, hexamethyleneimino, morpholino, lower dialkylmorpholino, or tetrahydropyridino or pharmaceutically acceptable acid addition salts thereof.

2. A compound as defined in claim 1 wherein said compound is 2-benzoyl-3-(2-pyrrolidino ethoxy)indole.

3. A compound as defined in claim 1 wherein said compound is 2-benzoyl-3-(2-pyrrolidino ethoxy)-5,6-methylenedioxy indole.

4. A compound as defined in claim 1 wherein said compound is 2-benzoyl-3-(2-dimethylamino ethoxy)indole.

5. A compound as defined in claim 1 wherein said compound is 2-(p-ethoxybenzoyl) - 3 - (2-pyrrolidinoethoxy)-5-methyl indole.

6. A compound as defined in claim 1 wherein said compound is 2-(p-methylbenzoyl) - 3 - (2-pyrrolidinoethoxy)-5-methyl indole.

7. A compound as defined in claim 1 wherein said compound is 2-(p-ethoxybenzoyl) - 3 - (2-pyrrolidinoethoxy)-5-methyl indole hydrochloride.

8. A compound as defined in claim 1 wherein said compound is 2-benzoyl - 3 - (2-dimethylamino ethoxy) indole hydrochloride.

9. A compound as defined in claim 1 wherein said compound is 2-(p-ethoxybenzoyl) - 3 - (2-pyrrolidinoethoxy) indole.

10. A compound as defined in claim 1 wherein said compound is 2-benzoyl-3-(2-diethylamino ethoxy) indole.

11. A compound as defined in claim 1 wherein said compound is 2-benzoyl - 3 - (2-pyrrolidinoethoxy)-5,6-dimethyl indole.

12. A compound as defined in claim 1 wherein said compound is 2-benzoyl - 3 - (2-pyrrolidinoethoxy)-5-hydroxy indole.

13. A compound as defined in claim 1 wherein said compound is 2-benzoyl-3-(2-pyrrolidinoethoxy)-5-acetoxy indole.

14. A compound as defined in claim 1 wherein said compound is 2-benzoyl - 3 - (2-pyrrolidinoethoxy)-5-methoxy indole.

15. A compound as defined in claim 1 wherein said compound is 2-benzoyl-3-(2-pyrrolidinoethoxy)indole hydrochloride.

16. A compound as defined in claim 1 wherein said compound is 2-benzoyl-3-(2-piperidinoethoxy)indole.

17. A compound as defined in claim 1 wherein said compound is 2-benzoyl-3-(2-piperidinoethoxy)indole hydrochloride.

References Cited

UNITED STATES PATENTS 3,410,857  11/1968  Schoen et al. _____ 260—326.14

HENRY R. JILES, Primary Examiner

S. D. WINTERS, Assistant Examiner

U.S. Cl. X.R.

260—247.2, 247.5, 294.3, 295, 296, 326.13, 326.14, 326.15, 326.16; 424—248, 263, 267, 274

UNITED STATES PATENT OFFICE
CERTIFICATE OF CORRECTION

Patent No. 3,509,163  Dated April 28, 1970

Inventor(s) Arne Elof Brandstrom and Stig Ake Ingemar and André Gagneux

It is certified that error appears in the above-identified patent and that said Letters Patent are hereby corrected as shown below:

col. 6, line 28 (4th line in table), "$C_6H_5-CH_2-O-O-CH_2-O-$" should be -- $-O-CH_2-O-$ -- col. 7, line 13, "ethooxy" should be --ethoxy-- col. 7, line 70 (last line in table) insert --indole hydrochloride-- Also delete "5" and insert in its place --20-- col. 10, line 22, replace "correspondingly" with --corresponding-- col. 11, first line in the table, "$-NC_4H_4$" should be -- $-NC_4H_8$ -- col. 12, line 66, "ethozy" should be --ethoxy-- col. 13, line 11, "pyrolidinyl" should be --pyrrolidinyl-- col. 13, line 23, "wxy" whould be --waxy--.

SIGNED AND SEALED
SEP 15 1970

(SEAL)
Attest:

Edward M. Fletcher, Jr.
Attesting Officer

WILLIAM E. SCHUYLER, JR.
Commissioner of Patents